(No Model.) 2 Sheets—Sheet 1.

A. H. CALKINS.
OIL BURNING HEATING APPARATUS FOR WATER TANKS.

No. 419,826. Patented Jan. 21, 1890.

Witnesses
Wm. F. Huning
Louis M. F. Whitehead

Inventor
Almon H. Calkins
by Dayton, Poole & Brown
Attorneys.

(No Model.) 2 Sheets—Sheet 2.

A. H. CALKINS.
OIL BURNING HEATING APPARATUS FOR WATER TANKS.

No. 419,826. Patented Jan. 21, 1890.

Witnesses
Louis M. F. Whitehead.
Wm. F. Henning.

Inventor
Almon H. Calkins
by Dayton, Poole & Brown
Attorneys.

UNITED STATES PATENT OFFICE.

ALMON H. CALKINS, OF CHICAGO, ILLINOIS.

OIL-BURNING HEATING APPARATUS FOR WATER-TANKS.

SPECIFICATION forming part of Letters Patent No. 419,826, dated January 21, 1890.

Application filed December 7, 1888. Serial No. 292,938. (No model.)

*To all whom it may concern:*

Be it known that I, ALMON H. CALKINS, of Chicago, in the county of Cook and State of Illinois, have invented certain new and useful Improvements in Oil-Burning Heating Apparatus for Water-Tanks; and I do hereby declare that the following is a full, clear, and exact description thereof, reference being had to the accompanying drawings, and to the letters of reference marked thereon, which form a part of this specification.

This invention relates to improvements in a heating device adapted for immersion in a water-tank for the purpose of heating the same, and adapted for burning oil or other liquid fuel, the invention relating more especially to a heating apparatus of the kind described containing a burner which consists of parallel plates placed together, said plates having an extended area of heating-surfaces, between which the fuel is confined in passing from a supply-pipe to the margins of the plates where it is burned. A burner of this general character is illustrated in a prior application for patent, Serial No. 266,921, filed by me in the United States Patent Office, March 12, 1888.

The invention consists in the matters hereinafter described, and pointed out in the appended claims.

Figure 1:
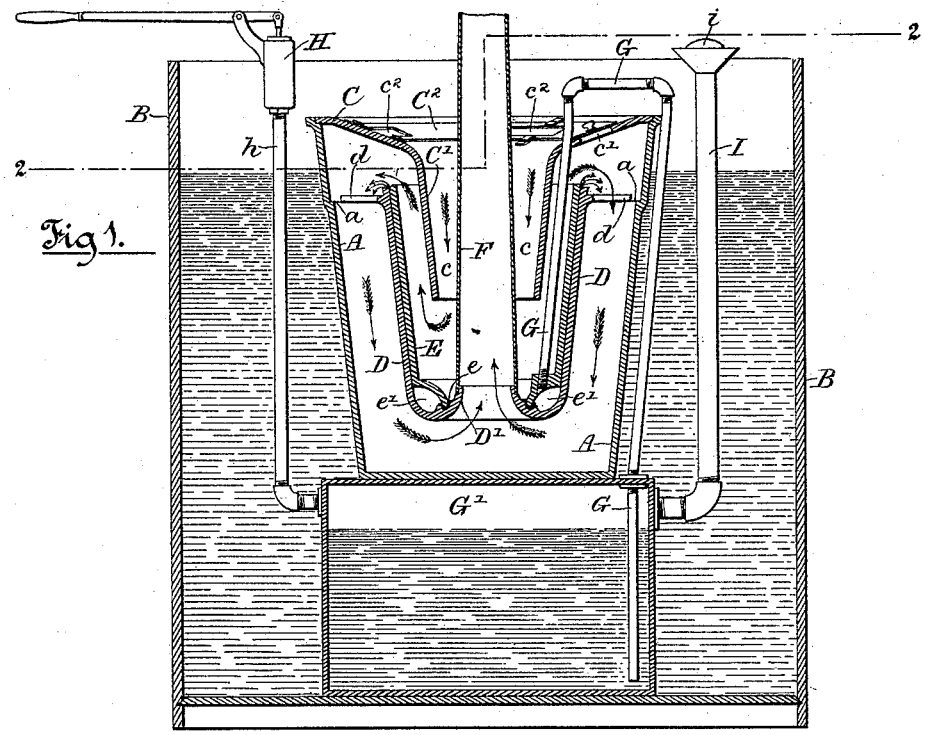
Figure 2:
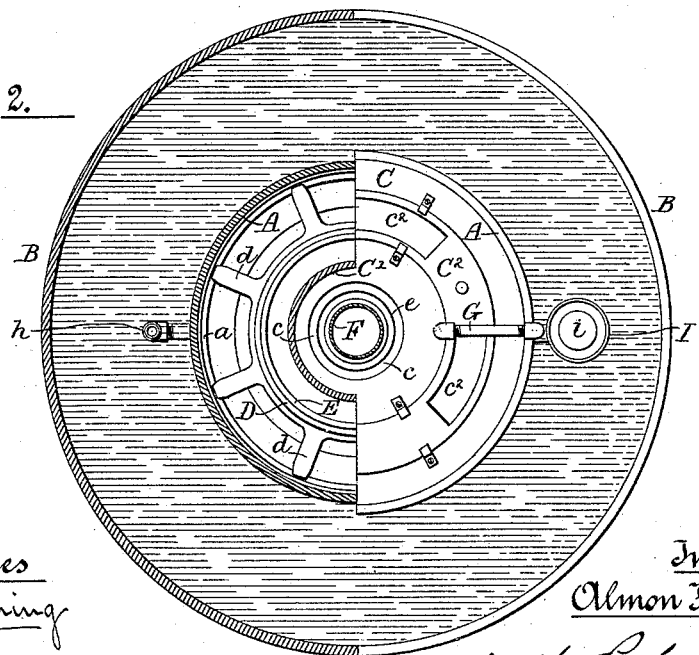
Figure 3:
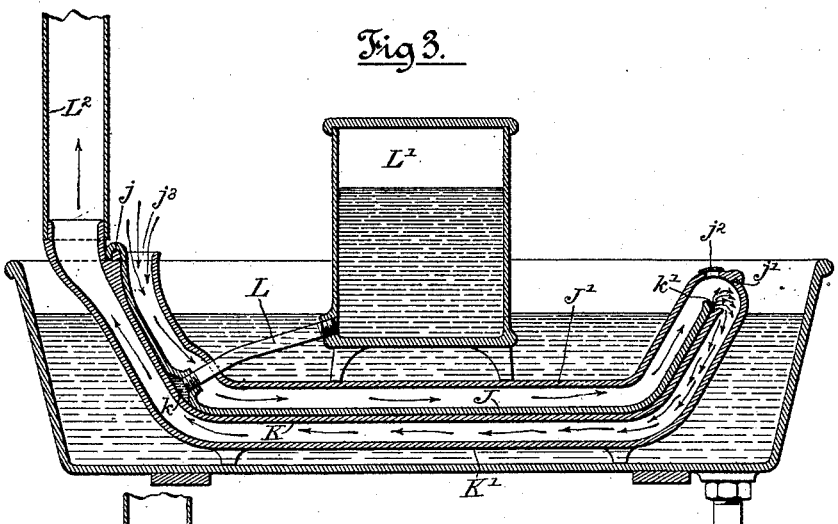
Figure 4:
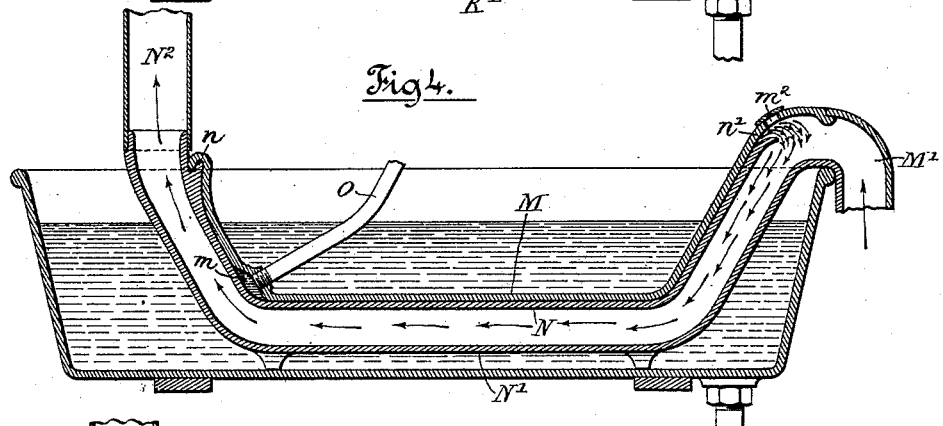
Figure 5:
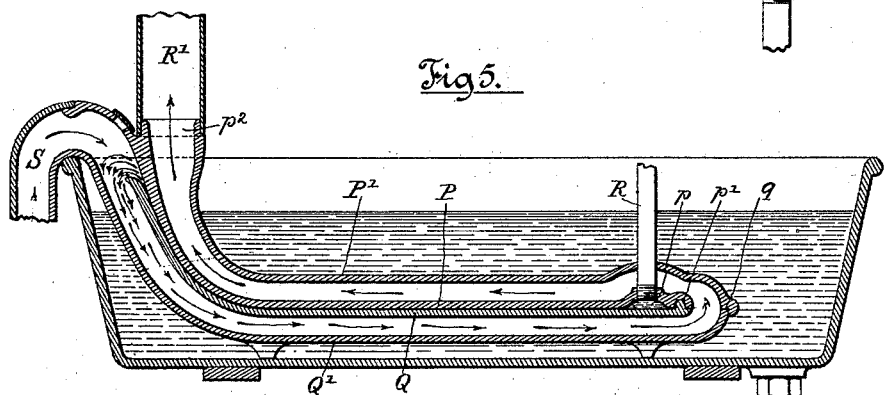

In the accompanying drawings, illustrating my invention, Figure 1 is a central vertical section of a tank containing a burner constructed in accordance with my invention.
Fig. 2 is a plan view of the same, partially in section, taken upon line 2 2 of Fig. 1. Figs. 3, 4, and 5 are sectional views illustrating other forms of heating apparatus embodying my invention.

As illustrated in Figs. 1 and 2, A is an exterior casing, consisting of a bottom and tubular side walls and adapted for immersion in a tank B containing water to be heated.

C is a cover for the casing, which is fitted at its outer margins to the upper edge of the casing, and is provided at its center with a depending tube C', forming an air-inlet opening c. Within the upper part of said cover C is formed a series of air-inlet openings c', which may be closed by means of an annular apertured sliding ring $C^2$, provided with openings $c^2$, corresponding with the draft-openings c'.

D and E are two parallel plates composing the vapor or gas generating part of the burner. Said plates are arranged parallel with each other and with their adjacent surfaces so close together as to afford space for the passage of an exceedingly thin film of fuel between them. Commonly the space is so narrow as to require no special construction in the plates for producing the same, the plates, whether formed of cast metal or otherwise, being placed and held in contact with each other, the slight roughness present in the surface of said plates, unless the same are fitted together with the greatest accuracy and very smoothly finished, affording a sufficient space for the passage of the fuel between them.

In the operation of the burner oil is fed between the plates at one point and issues from between the margins of the same to a point distant from the oil-supply pipe, and is converted into vaporous or gaseous form in its passage between the plates, which latter are highly heated by the passage over them of the flame from the burning fuel. In the particular construction shown the plates D and E are of tubular and slightly conical form. The outer plate D is supported from the casing of the burner, while the plate E rests within and in contact with the said plate D. The said plates D and E are, furthermore, located within the casing between the outer walls thereof and the depending tubular part C' of the cover C, and are sustained in this position by means of radial arms *d d* upon the outer plate D, which arms engage a shoulder *a* upon the outer casing A. At its lower end the outer burner-plate D is curved inwardly and provided with a central upturned tubular part D', to which is fitted a smoke-pipe F, which extends upwardly inside of the inner burner-plate E and through the tubular part C' of the cover and the draft-opening therein to a point considerably above the casing. The lower margin of the plate E forms a joint at *e* with the lower part of the plate D, and an annular oil-passage *e'* is formed between the lower parts of said plates adjacent to the said joint *e*, in the manner illustrated.

G is an oil-supply pipe, which communicates with the said passage *c'*. In the operation of the burner oil fed to the said passage *e'* through the oil-supply pipe passes upwardly between the burner-plates D and E, and being converted into vapor or gas by the heat of said plates issues in vaporous or gaseous form at the upper edges thereof and is there burned. Air for supporting combustion enters the casing through the space between the tubular part C' of the cover and the smoke-pipe F, passing downwardly through said space, and then upwardly between the said tubular part C' and the burner-plate E to the point of combustion. The flames and products of combustion pass downwardly between the burner-plate D and the outer casing around the lower margin of the said burner-plate D and up through the smoke-pipe F, as indicated by the arrows in the drawings. The openings *c'* afford access to the upper margins of the burner-plates for lighting the fuel in starting the burner, and the sliding damper $C^2$ enables the draft through said openings to be controlled as desired.

The oil-supply pipe for supplying the burner may be fed with oil from any suitable tank or source of supply. In some cases, however, the tank containing the water to be heated is located in an exposed position where an oil-tank located adjacent thereto is exposed to the cold, thereby rendering the oil therein too thick to freely flow through the supply-pipe. As an improved construction in the heating apparatus adapted for use in places of the character described, therefore, I employ the construction illustrated in Figs. 1 and 2, where an oil-supply tank G' is placed in the bottom of the water-tank B, said oil-tank being closed and having the oil-supply pipe extending to or opening into the bottom thereof. Connected with the said oil-tank G' by means of a pipe *h* is an air-pump H, by which air-pressure may be put upon the interior of the tank for the purpose of forcing the oil out of the same through the oil-supply pipe G. The said air-pump H is herein shown as supported upon the pipe *h*, which extends upwardly from the tank to a point above the surface of the water; but said pump may be otherwise supported or located, as found convenient or desirable.

I is a filling-pipe connected with the tank and extending above the water-line, said filling-pipe being provided with a stopper *i*, by which the filling-opening may be made air-tight in a manner heretofore common.

I do not claim as my invention an oil-supply tank in connection with means for producing air-pressure therein, as I am aware that a device of this kind has been heretofore employed.

A principal feature of my invention consists in an oil-burning water-heater provided with burner-plates arranged nearly in contact with each other, said burner-plates being located within a closed exterior casing having air-inlet and smoke-exit openings at its top. This broad feature of my construction may be carried out by devices of other forms than the particular one illustrated in Figs. 1 and 2. In Figs. 3, 4, and 5, for instance, I have illustrated other forms of water-heating apparatus, these being more especially adapted for use in connection with shallow tanks.

As illustrated in Fig. 3, J is the top plate, and K the bottom plate, forming the oil-vaporizer or gas-generating part of the burner, the top plate J being arranged to rest upon the plate K, so as to afford an exceedingly narrow space or passage for the fuel between the plates. Said plates J and K are horizontal in their middle parts and bent upwardly at each end, as shown. At one of its ends the plate J is connected with the plate K by a joint *j*, formed by interfitting tongues and grooves upon the plates, and between said plates J and K, adjacent to the joint *j*, is formed a transverse oil-passage *k*, with which communicates an oil-supply pipe L, leading from a supply-tank L', or other source of oil-supply. Oil entering between the plates from said oil-passage *k* is converted into vapor or gas in its passage between the plates and makes its exit at the opposite margins of the plates at the point marked *k'*. K' is the bottom plate of the burner-casing, which is arranged below and parallel with the plate K and is preferably cast integral therewith. J' is a plate forming the top of the burner-casing, said plate being arranged parallel with the top plate J. At the margins of the plates J and K, where the fuel is burned, the walls J' K' are connected by a joint *j'*, an opening $j^2$ being formed in the plate J', adjacent to the edges of the plates J K, to afford access to the same for the purpose of lighting the fuel in starting the burner. At the opposite margin of said plate, adjacent to the joint *j*, an air-inlet opening $j^3$ is provided, by which air for supporting combustion may freely enter the space between the plate J and the top wall J' of the burner-casing. The end of the space between the lower burner-plate K and the bottom wall K' of the casing communicates with a smoke-exit pipe $L^2$, which is fitted to the upper end of the casting forming the plate K and wall K', in the manner shown. In the operation of this burner, flame produced by the combustion of the vapor or gas issuing from between the plates passes through the space between the burner-plate K and lower wall K' of the casing, and thereby maintains the said plate K, the plate J in contact therewith, at a high temperature, while the air for supporting combustion which passes through the space between the said plate J and the top wall J' becomes highly heated by contact with the said plate J before reaching the point of combustion.

In Fig. 4 I have shown a burner which is generally similar to that shown in Fig. 3, but somewhat more simple in its construction. In this instance M is a plate which forms the top plate of the burner, as well as the top wall of the burner-casing. N is the bottom plate of the burner, which is arranged in contact with the plate M. Parallel with the plate N is a plate N', which forms the bottom wall of the burner-casing. A smoke-exit pipe $N^2$ is connected with the space between the plate N and wall N' at one end of the burner-plates, while a tubular part M' is connected with the plate M and with the plate N', and thereby forms an air-inlet opening or passage. Oil is fed by means of a supply-pipe O to a transverse passage $m$, formed between the plates M and N, the margins of said plates adjacent to the oil-passage $m$ being closed by a joint $n$. The fuel in its passage between the plates is converted into vapor or gas, which is burned as it issues from between the plates at $n'$, in the manner hereinbefore described. $m^2$ is an opening formed in the top plate M, adjacent to the point of combustion, to enable the fuel to be easily ignited in starting the burner.

Fig. 5 illustrates a construction in the burner for use in heating water in tanks which is generally similar to that shown in Figs. 3 and 4, but wherein the air-inlet and smoke-exit apertures are located at the same end of the burner. In this instance P and Q are the upper and lower plates forming the vapor or gas generating part of the burner. These plates are horizontal in their main parts, but are bent upwardly at one end, so as to bring their edges at which the fuel is burned considerably above the horizontal parts of the plates. Between the said plates, at the lower edges thereof, is formed an oil-passage $p$, with which communicates an oil-supply pipe R. A joint $p'$ is formed between the margins of the plates adjacent to said oil-passage $p$. P' is the top wall of the casing arranged above and parallel with the plate P, and Q' the bottom wall arranged below and parallel with the plate Q. These plates are connected with each other at $q$ by a tight joint. The plate P and wall P' are cast integral with each other, and at their upper edges are formed to provide a smoke-exit opening $p^2$, with which is connected a smoke-pipe R'. Adjacent to the said smoke-exit opening is formed a tubular air-inlet passage S, affording an abundant supply of air to the margins of the plates P and Q, at which combustion takes place. In a burner of this form the flames and products of combustion pass over the surfaces of both of the burner-plates P and Q, as clearly shown by the arrows in the drawings, thereby insuring the maintenance of said plates at a high temperature during the operation of the burner.

I claim as my invention—

1. An oil-burning heating apparatus for water-tanks, comprising an exterior closed shell or casing having an air-inlet opening at its top only, two parallel burner-plates located within the casing, an oil-pipe supplying oil to the space between said plates, and an exit-pipe for smoke and products of combustion, substantially as described.

2. An oil-burning heater for water-tanks, comprising an exterior closed casing having side walls of tubular form, two parallel burner-plates of tubular form located concentrically within said burner-casing, an oil-pipe supplying oil to the space between the said burner-plates at the lower margins thereof, and a smoke-pipe connected with the said lower margins of the burner-plate, said burner-casing being provided with a central air-inlet opening in its top only and surrounding the smoke-exit pipe.

In testimony that I claim the foregoing as my invention I affix my signature in presence of two witnesses.

ALMON H. CALKINS.

Witnesses:
C. CLARENCE POOLE,
TAYLOR E. BROWN.